(12) United States Patent
Guyette

(10) Patent No.: US 7,418,281 B2
(45) Date of Patent: Aug. 26, 2008

(54) CENTRALIZED VOICE RECOGNITION UNIT FOR WIRELESS CONTROL OF PERSONAL MOBILE ELECTRONIC DEVICES

(75) Inventor: Thomas M. Guyette, Los Angeles, CA (US)

(73) Assignee: International Business Machines Corporation, Armonk, NY (US)

( * ) Notice: Subject to any disclaimer, the term of this patent is extended or adjusted under 35 U.S.C. 154(b) by 333 days.

(21) Appl. No.: 11/225,616

(22) Filed: Sep. 13, 2005

(65) Prior Publication Data

US 2007/0060118 A1 Mar. 15, 2007

(51) Int. Cl.
 *H04M 1/00* (2006.01)
(52) U.S. Cl. .................. 455/575.6; 455/41.2; 455/563; 345/8; 345/169
(58) Field of Classification Search ............... 455/41.1, 455/41.2, 404.1, 563, 569.1, 575.2, 575.6; 345/8, 157, 158, 169, 173, 156
See application file for complete search history.

(56) References Cited

U.S. PATENT DOCUMENTS

| | | | | |
|---|---|---|---|---|
| 5,864,481 | A * | 1/1999 | Gross et al. | 700/90 |
| 6,167,413 | A * | 12/2000 | Daley, III | 708/139 |
| 6,443,347 | B1 * | 9/2002 | Elizalde et al. | 224/626 |
| 6,538,623 | B1 * | 3/2003 | Parnian et al. | 345/8 |
| 6,762,692 | B1 | 7/2004 | Mingot et al. | |
| 6,995,665 | B2 * | 2/2006 | Appelt et al. | 340/521 |
| 7,034,678 | B2 * | 4/2006 | Burkley et al. | 340/539.13 |
| 7,263,379 | B1 * | 8/2007 | Parkulo et al. | 455/521 |
| 2002/0008625 | A1 * | 1/2002 | Adams et al. | 340/573.1 |
| 2002/0186180 | A1 * | 12/2002 | Duda | 345/8 |
| 2003/0060202 | A1 * | 3/2003 | Roberts | 455/445 |
| 2003/0174049 | A1 * | 9/2003 | Beigel et al. | 340/10.42 |
| 2003/0236821 | A1 * | 12/2003 | Jiau | 709/203 |
| 2004/0004547 | A1 * | 1/2004 | Appelt et al. | 340/573.1 |
| 2004/0203387 | A1 * | 10/2004 | Grannan | 455/41.2 |
| 2006/0125630 | A1 * | 6/2006 | Parkulo | 340/539.12 |

FOREIGN PATENT DOCUMENTS

| | | |
|---|---|---|
| EP | 1403212 A2 | 3/2004 |
| JP | 61117601 A | 6/1986 |
| JP | 62252223 A | 11/1987 |
| JP | 4351094 A | 12/1992 |
| JP | 10011084 A | 1/1998 |
| JP | 11249772 A | 9/1999 |
| JP | 11296073 A | 10/1999 |

(Continued)

*Primary Examiner*—William Trost
*Assistant Examiner*—James D Ewart
(74) *Attorney, Agent, or Firm*—Guerin & Rodriguez, LLP; William G. Guerin

(57) ABSTRACT

Described are a method and system for controlling the operation of personal mobile electronic devices disposed about a user. Each device is adapted to receive command according to a common wireless protocol. A voice signal is generated in response to a voice command spoken by the user. Command data are generated for one of the devices in response to the voice signal. The command data are transmitted through a wireless link to the respective device to control an operation of the device. There is no need for each device to have independent voice recognition capability. Instead, the burden of voice recognition is managed by the wearable command module that communicates with all the controlled devices through wireless links.

6 Claims, 3 Drawing Sheets

FOREIGN PATENT DOCUMENTS

| | | |
|---|---|---|
| JP | 2000074466 A | 3/2000 |
| JP | 2002062894 A | 2/2002 |
| JP | 2002135868 A | 5/2002 |
| JP | 2002261879 A | 9/2002 |
| JP | 2002368837 A | 12/2002 |
| JP | 2003323257 A | 11/2003 |

* cited by examiner

CENTRALIZED VOICE RECOGNITION UNIT FOR WIRELESS CONTROL OF PERSONAL MOBILE ELECTRONIC DEVICES

FIELD OF THE INVENTION

The invention relates generally to voice recognition for control and monitoring of personal mobile electronic devices. In particular, the invention relates to a system for controlling and monitoring the operation of multiple personal mobile electronic devices worn by a user using voice commands.

BACKGROUND OF THE INVENTION

The use of personal mobile electronic devices that can be carried on a person has increased dramatically in recent years. Such devices include cellular telephones, personal digital assistants (PDAs), handheld computers, broadcast systems, music and video playback devices, sophisticated digital watches and calculators. A personal mobile device can be transported by the user by attaching the device to clothing or articles worn by the user or carrying the device within the clothing. For example, some personal mobile devices can be carried in a shirt pocket, clipped to a belt, or otherwise attached to or included in apparel or other items worn by the user. Other personal mobile devices can be secured to the body using a wristband, armband, headset clip and the like.

User interaction with personal mobile devices can be improved by providing voice recognition capability. The user speaks a voice command which is recognized by the device and results in the activation of a particular device feature or operation. Devices that provide voice recognition capability are typically larger in size than similar devices without such capabilities due to the size of the embedded microphone and voice recognition unit. Consequently, it can be impractical for a user to carry multiple personal mobile devices each having its own voice recognition capability. Furthermore, the cost to the user for including a microphone and voice recognition unit in each device can be substantial.

The location of a personal mobile electronic device about the body can limit its ability to receive voice commands without distortion. For instance, a device not disposed in the front hemisphere about a user's head (i.e., near the mouth), such as a device secured to a belt or disposed in a pocket, may receive muffled or distorted speech. Moreover, as the distance between the device and the user's mouth increases, background noise can degrade the ability of the device to interpret voice commands spoken by the user. For example, the device can have difficulty differentiating between casual conversation in the same area as the user, and the user himself. If the device does not recognize a voice command, the device may not respond or an improper device feature or operation may be activated, causing delays, confusing operations, and causing user frustration.

What is needed are a method and system that allow a user to control personal mobile electronic devices disposed proximate to the body that are not subject to the problems described above. The present invention satisfies this need and provides additional advantages.

SUMMARY OF THE INVENTION

In one aspect, the invention features a system for controlling the operation of a plurality of personal mobile electronic devices disposed proximate to a user. Each of the personal mobile electronic devices is adapted to receive commands in accordance with a wireless protocol. The system includes a microphone and a wearable command module. The microphone generates a voice signal responsive to a voice command spoken by the user. The wearable command module includes a voice recognition unit in communication with the microphone. The voice recognition unit generates command data for one of the personal mobile electronic devices in response to the voice signal. The wearable command module also includes a wireless data transmitter in electrical communication with the voice recognition unit. The wireless data transmitter transmits the command data encoded in accordance with the wireless protocol. The encoded command data controls an operation of one of the personal mobile electronic devices.

In another aspect, the invention features a method for controlling the operation of a plurality of personal mobile electronic devices disposed proximate to a user. Each of the personal mobile electronic devices is adapted to receive commands in accordance with a wireless protocol. A voice signal is generated in response to a voice command spoken by the user and command data are generated for one of the personal mobile electronic devices in response to the voice signal. The command data are transmitted in accordance with the wireless protocol to control an operation of the one of the personal mobile electronic devices.

BRIEF DESCRIPTION OF THE DRAWINGS

The above and further advantages of this invention may be better understood by referring to the following description in conjunction with the accompanying drawings, in which like numerals indicate like structural elements and features in the various figures. The drawings are not necessarily to scale, emphasis instead being placed upon illustrating the principles of the invention.

DETAILED DESCRIPTION

In brief overview, the present invention relates to a system and method for controlling the operation of personal mobile electronic devices disposed proximate to a user. The system includes a microphone to generate a voice signal in response to a voice command spoken by a user. The system also includes a wearable command module that includes a voice recognition unit and a wireless data transmitter. The voice recognition unit generates command data for one of the devices in response to the voice signal. The transmitter sends the command data encoded according to a wireless protocol to control the operation of the personal mobile electronic device. Advantageously, there is no requirement for each device to have independent voice recognition capability. Instead, the burden of voice recognition is managed by the single wearable command module that communicates with all the controlled devices through a wireless link. Consequently, manufacturing of the devices is simplified and the size, weight and cost of the devices are decreased.

Figure 1:
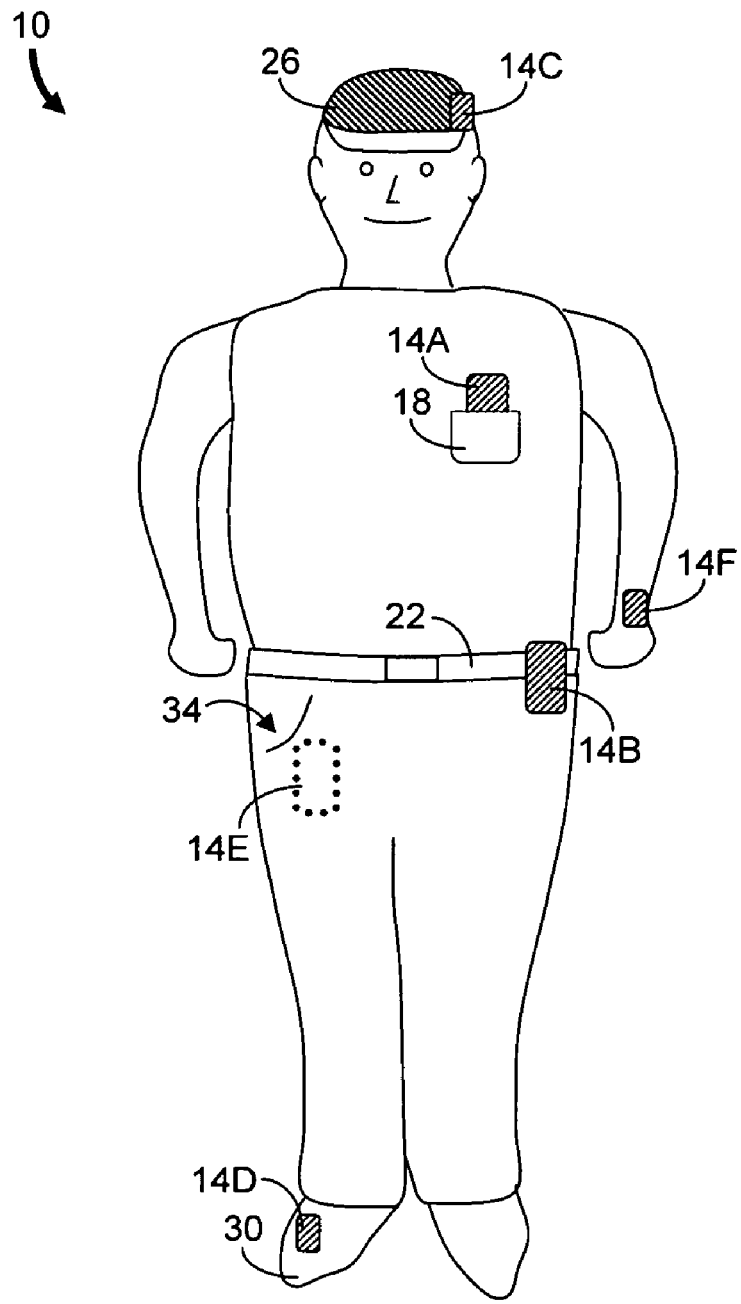
FIG. 1 illustrates a person wearing a variety of personal mobile devices.

FIG. 1 shows an example of a user 10 carrying a variety of personal mobile electronic devices 14A to 14E (generally 14) about the body. The devices 14 can be, for example, cellular telephones and other mobile communication devices, personal digital assistants (PDAs), handheld computers and control devices for remote systems and equipment. One device 14A is shown protruding from a shirt pocket 18 and another device 14B is clipped to a belt 22. Other devices 14C and 14D are attached to a hat 26 and a shoe 30, respectively. Additional devices 14E (not directly visible but depicted by a dashed line) and 14F are disposed in a pants pocket 34 and attached to the user's wrist, respectively. Other arrangements are of course possible, and limited only by the imagination of the device designers.

If each device 14 individually provides voice command capability, the size and weight due to the embedded microphones and voice recognition units can limit the mobility of the user 10. Moreover, to operate one of the devices 14 using voice commands, the user 10 generally has to unfasten or otherwise retrieve the device 14 from its position about the body and to hold the device 14 near the user's mouth to provide for clear voice command reception.

In an embodiment of a system for controlling the operation of personal mobile devices disposed on a user according to the invention, a single microphone and a wearable command module are used to facilitate voice command operation of the personal mobile devices 14. The wearable command module includes a voice recognition unit to receive voice signals that are generated by the microphone in response to voice commands spoken by the user 10. The voice recognition unit generates command data for the device 14 specified in the voice command. A wireless data transmitter included in the wearable command module receives the command data from the voice recognition unit and encodes the command data according to a wireless protocol (e.g., Bluetooth™). The encoded command data is transmitted to the device 14 and causes the performance of the desired device function or operation. Advantageously, a single microphone which can be positioned in the front hemisphere about the user's head where speech is clearest receives the voice commands for multiple devices 14. In addition, the need to include a voice recognition unit in each device 14 is avoided, thus the devices 14 are generally smaller, lighter and less costly than would otherwise be possible.

Figure 2:
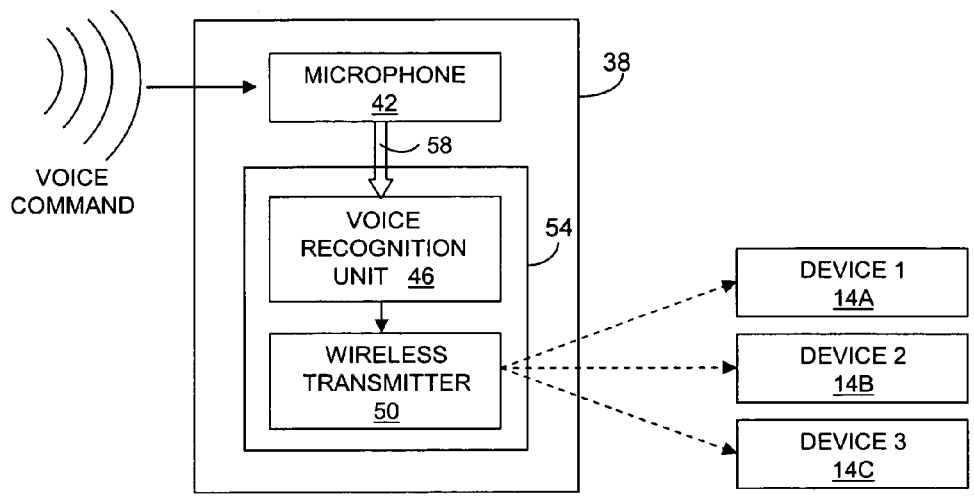
FIG. 2 is a block diagram of an embodiment of a system for controlling the operation of personal mobile devices disposed proximate to a user in accordance with the invention.

Referring to the block diagram of FIG. 2, an embodiment of a system 38 for controlling the operation of personal mobile electronic devices 14 disposed on or proximate to a user includes a microphone 42, a voice recognition unit 46 and a wireless transmitter 50. The microphone 42 is configurable for positioning near the mouth of the user. For example, the microphone 42 can be provided on an adjustable boom of a headset worn by the user. As illustrated, the voice recognition unit 46 and wireless transmitter 50 are conveniently integrated as a single wearable command module 54 that can be worn by the user in a location separate from the microphone 42. For example, the wearable command module 54 can be placed in a shirt pocket or secured to a belt. In an alternative embodiment, the microphone 42 and wearable command module 54 are combined as a single module or article (e.g., a headset) that can be worn by the user in a position where clear speech can be received.

The microphone 42 and wearable command module 54 can be a portable stand-alone module or can be integrated into a personal mobile electronic device 14. By way of example, the wearable command module 54 can be integrated into a "master device" that may have a primary use but can also be used to coordinate communications with all the user devices 14. For example, a master device can be a cellular telephone, PDA, portable computer system (e.g., handheld computer, laptop computer) and the like.

In response to a received voice command, the microphone 42 generates a voice signal and transmits the signal to the voice recognition unit 46 over a communication link 58. If the microphone 42 is provided in a corded headset, the communication link 58 includes an electrically conductive path. Alternatively, the microphone 42 can be part of a wireless headset and the communication link 58 is a wireless link that utilizes any of a variety of wireless protocols.

The single microphone 42, centralized voice recognition unit 46 and wireless transmitter 50 enable the user to address all the personal mobile devices 14 worn on or disposed near to the user. Each voice command spoken by the user includes the programmed name of the device 14 to be controlled. The devices 14 are capable of receiving and interpreting data encoded according to the protocol of the wireless transmitter 50. Encoded data can include text, extensible markup language (XML) or other formatted commands generally including only small quantities of data. No additional external voice translation software or hardware is necessary.

The command set used by the system 38 is extensible. Any device 14 that communicates using the same protocol as the wireless transmitter 50 can be controlled. The user is not required to program the command set in advance or to perform mapping tasks to match voice commands to actions that can be performed by the controlled device, although such re-mapping functionality can be available and may be desirable by users. During a handshake phase, bidirectional communication occurs so that a command set understood by the device 14 is shared with the voice recognition unit 46. Subsequently, voice commands spoken by the user are translated into commands the device 14 understands.

As an example of the naming of devices 14, the wearable command module 54 can provide a "find devices" function to enable the user to browse and select controllable devices 14 for initialization. Upon selection, the wearable command module 54 communicates with the selected device using a data protocol that allows the device to indicate what functions it can perform, including a "name now" function. When the name now function is selected, the device replies with "speak my name now" to the wearable command module 54. The user then speaks the desired name for the device and the device replies to indicate it understands the spoken name. For example, the device can reply "I am now <NAME>." Devices can maintain their own command sets which include standard commands such as "set name", "turn off", "stop listening" and the like.

Figure 3:
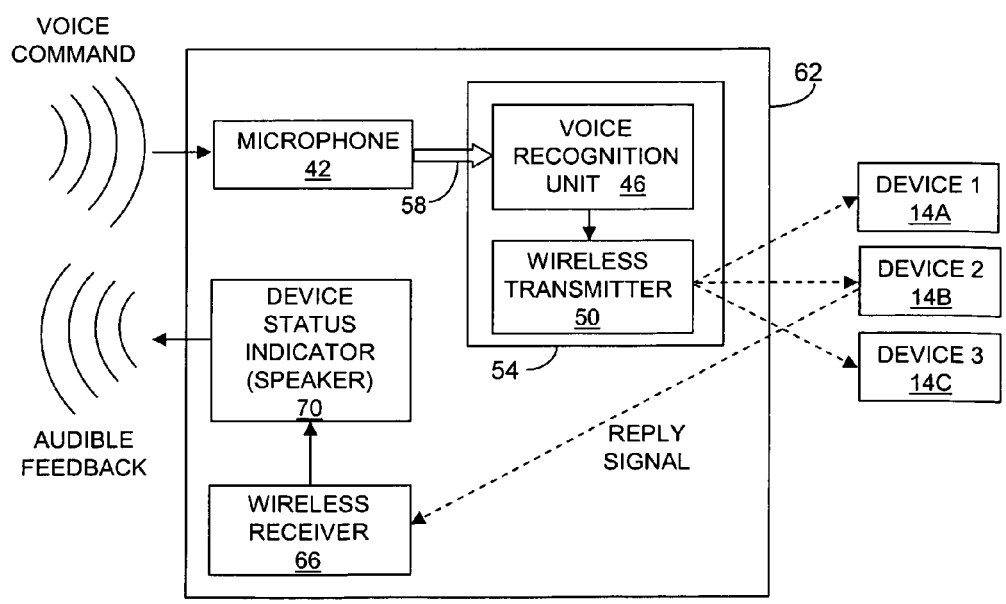
FIG. 3 is a block diagram of another embodiment of a system for controlling the operation of personal mobile devices disposed proximate to a user in accordance with the invention.
Figure 4:
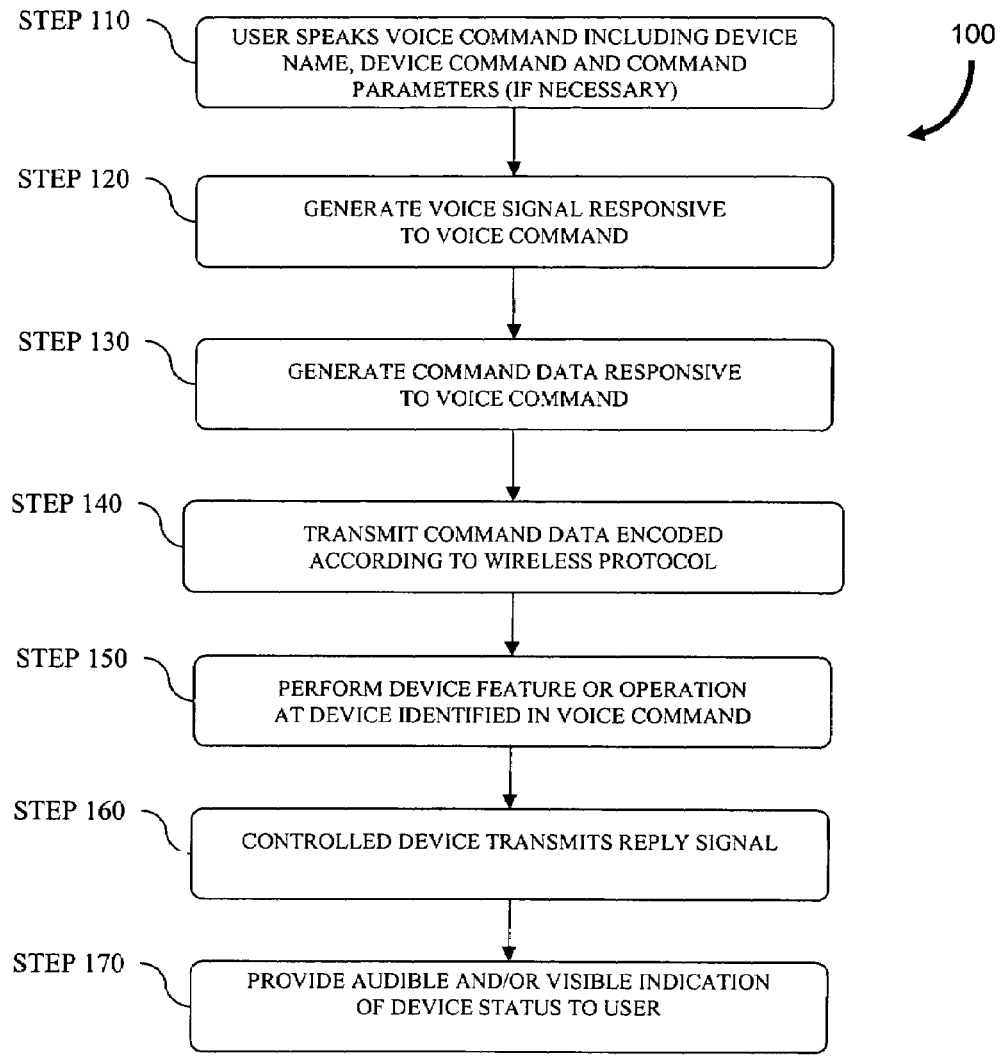
FIG. 4 is a flowchart representation of an embodiment of a method for controlling the operation of personal mobile devices disposed proximate to a user in accordance with the invention.

FIG. 3 is a block diagram of another embodiment of a system 62 for controlling the operation of personal mobile electronic devices 14 disposed on or proximate to a user. The system 62 includes the components of the system 38 of FIG. 2 and additionally includes a wireless receiver 66 and a speaker 70. FIG. 4 is a flowchart depiction of an embodiment of a method 100 for controlling the operation of personal mobile electronic devices disposed on a user. Referring to FIG. 3 and FIG. 4, a user speaks a voice command (step 110) to cause a particular device 14 to execute a desired device feature or operation.

Voice commands in one example are structured as:

<Device Name>:<Command>, <Command Parameters> where Device Name is the name assigned by the user to the device 14 to be controlled, Command is the device feature or operation to be executed and Command Parameters are parameters used to define the scope of the operation. For example, the user controls a public address (PA) system by saying "PA system: Tell the audience, license number 123 456 your lights are on". Thus the phrase "License number 123 456 your lights are on" is broadcast from speakers in the PA system. In another example, the user says "Clock: Ring at, six-thirty AM Tuesday" to program a clock to sound an alarm. Some voice commands do not require any content for Command Parameters. For example, the user can control a remote control device for a garage door by saying either "Garage door: Open" or "Garage door: Close".

A voice signal responsive to the voice command is generated (step 120) by the microphone 42 and provided to the voice recognition unit 46 which responds by generating (step 130) command data. The command data is encoded and transmitted to the device (step 140) according to a wireless protocol such as the Bluetooth wireless protocol. Although all the devices 14 within the operating range of the wireless transmitter 50 receive the encoded command data, only the device 14 specified by its programmed name in the encoded command data responds to the command and activates (step 150) the desired device feature or operation.

After receipt of the command data, if the controlled device 14 has optional command confirmation capability, a reply signal is generated (step 160) to provide feedback information to the user such as device status. The reply signal is received by the wireless receiver 66 and provided to a device status indicator 70. In the illustrated embodiment the device status indicator 70 is a speaker. Preferably the device status indicator 70 and microphone 42 are integrated as a single module or provided as components of a common article such as a headset or other form of headgear worn by the user. In one embodiment, the wireless receiver 66 is integrated into the wearable command module 54 and communications between the wireless receiver 66 and the device status indicator 70 are provided using the same communications link 58 used by the microphone 42 and voice recognition unit 46.

If the command is understood and properly executed by the device 14, the reply signal causes an audible confirmation such as a spoken "OK" or a ding to be generated (step 170) by the speaker 70. Conversely, if the device 14 fails to execute the desired device feature or operation, the reply signal causes an audible error indication such as a spoken "Error" or a buzz to be generated (step 170) by the speaker 70. If the device 14 cannot interpret the command data, the reply signal causes the speaker 70 to generate (step 170) an audible message to the user such as a spoken "Please say that again" or a tone to indicate that the command is not understood.

In other system embodiments, the device status indicator 70 can present other forms of feedback information to the user. For example, the device status indicator 70 can include one or more optical sources (e.g., light emitting diodes (LEDs)) that emit light of a particular color according to the state of the reply signal. Alternatively, the optical source can be modulated to "blink" according to various sequences to provide the status to the user. In another example, the device status indicator 70 is a liquid crystal display (LCD) for presenting text or graphics to the user.

While the invention has been shown and described with reference to specific embodiments, it should be understood by those skilled in the art that various changes in form and detail may be made therein without departing from the spirit and scope of the invention.

What is claimed is:

1. A method for controlling the operation of a plurality of personal mobile electronic devices disposed proximate to a user, each of the personal mobile electronic devices being capable of operating with a control module and each of the personal mobile electronic devices being capable of operating independent of the control module, and each of the personal mobile electronic devices being adapted to receive commands in accordance with a command set, the method comprising:
    generating a voice signal responsive to a voice command spoken by the user;
    generating command data for one of the personal mobile electronic devices according to a wireless protocol in response to the voice signal and a respective one of the command sets; and
    transmitting the command data in accordance with the wireless protocol to control an operation of the one of the personal mobile electronic devices.

2. The method of claim 1 further comprising receiving status data in accordance with the wireless protocol.

3. The method of claim 1 further comprising transmitting a reply signal to indicate to the user a device status of the one of the personal mobile electronic devices.

4. The method of claim 3 further comprising generating an audible indication of the device status.

5. The method of claim 3 further comprising generating a visible indication of the device status.

6. The method of claim 1 wherein the voice command comprises a device name assigned to the one of the personal mobile electronic devices.

\* \* \* \* \*